United States Patent [19]

Saito et al.

[11] E Re. 29,361

[45] Reissued Aug. 16, 1977

[54] PROCESS FOR SHAPING WORKPIECE BY ELECTRICAL DISCHARGE AND APPARATUS THEREFOR

[75] Inventors: Nagao Saito; Kazuhiko Kobayashi, both of Nagoya; Shigeru Takagi, Kasugai, all of Japan

[73] Assignee: Mitsubishi Denki Kabushiki Kaisha, Tokyo, Japan

[21] Appl. No.: 599,392

[22] Filed: July 28, 1975

Related U.S. Patent Documents

Reissue of:

[64] Patent No.: 3,705,287
Issued: Dec. 5, 1972
Appl. No.: 132,519
Filed: Apr. 8, 1971

[30] Foreign Application Priority Data

June 2, 1970 Japan ..... 45-47389

[51] Int. Cl.[2] ..... B23P 1/08

[52] U.S. Cl. ..... 219/69 C; 219/69 M; 219/69 P

[58] Field of Search ..... 219/69 P, 69 C, 69 M

[56] References Cited

U.S. PATENT DOCUMENTS

| | | | |
|---|---|---|---|
| 2,835,785 | 5/1958 | Williams | 219/69 P |
| 2,979,639 | 4/1961 | Williams et al. | 219/69 P |
| 3,604,885 | 9/1971 | Inoue | 219/69 P |
| 3,916,138 | 10/1975 | Pfau | 219/69 C |

*Primary Examiner*—Bruce A. Reynolds
*Attorney, Agent, or Firm*—Oblon, Fisher, Spivak, McClelland & Maier

[57] ABSTRACT

A process for shaping a workpiece using an electrical discharge and an apparatus for practicing the process is disclosed. According to the process, a workpiece is shaped by intermittently impressing a voltage pulse across a working gap between the workpiece and an appropriately shaped electrode. The process includes the step of controlling the duration of the electrical discharge in the working gap in accordance with operating conditions in the working gap to control the average current flow. The apparatus includes a control circuit having a capacitor circuit which controls the duration of the current discharge depending directly upon the time during which the no-load voltage exists in the working gap.

6 Claims, 13 Drawing Figures

FIG. 1
(PRIOR ART)
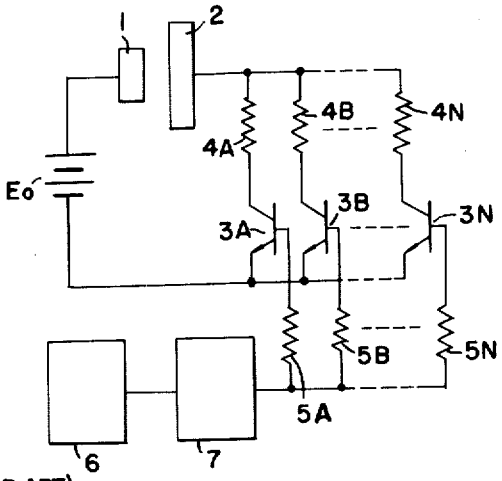
FIG. 2 (PRIOR ART)
FIG. 2A
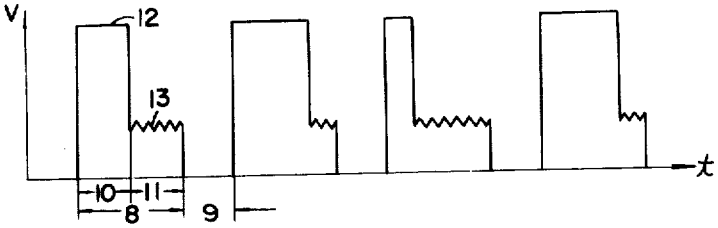
FIG. 2B
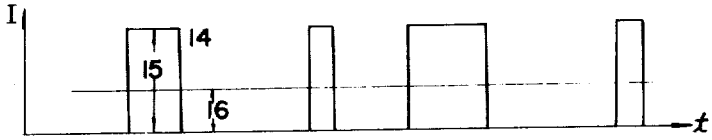
FIG. 3 (PRIOR ART)
FIG. 3A
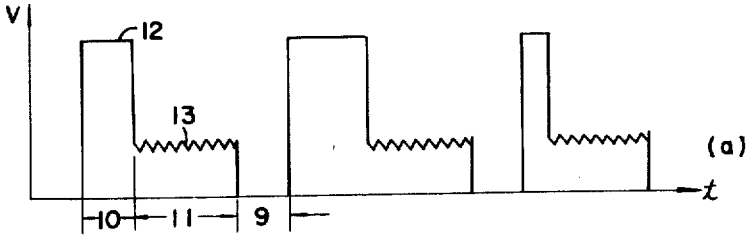
FIG. 3B
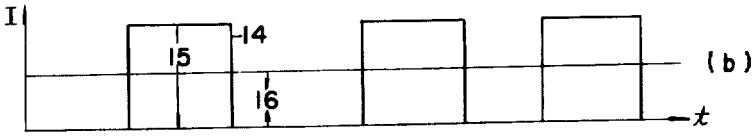
INVENTORS
NAGAO SAITO
KAZUHIKO KOBAYASHI
SHIGERU TAKAGI
BY Oblon, Fisher & Spivak
ATTORNEY FIG. 4 (PRIOR ART)
FIG. 4A
FIG. 4B
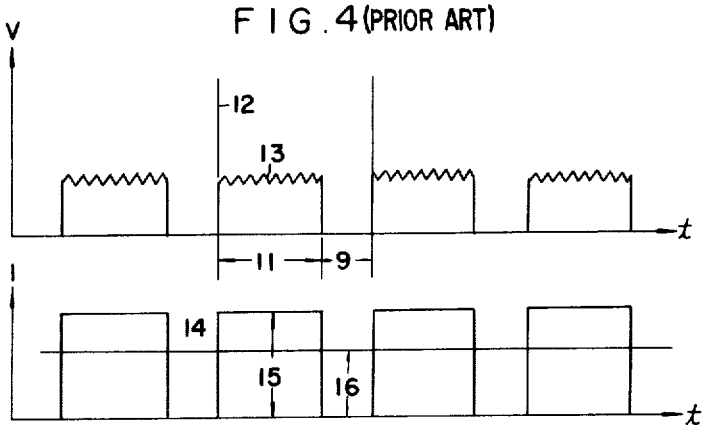
FIG. 5
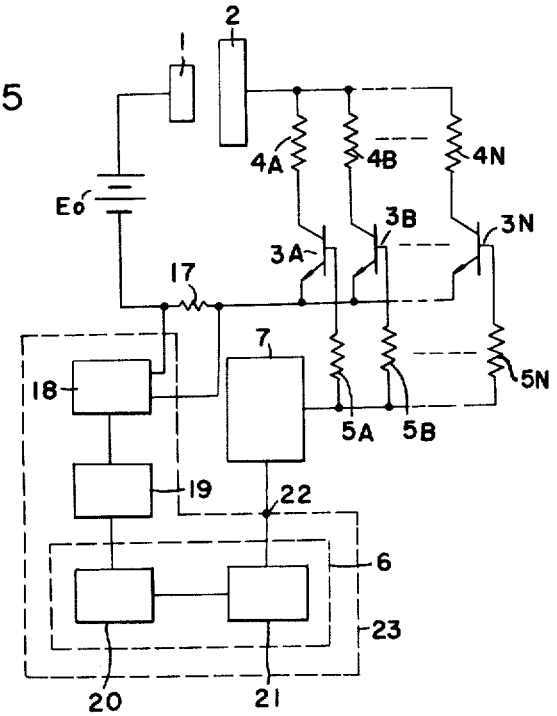

PROCESS FOR SHAPING WORKPIECE BY ELECTRICAL DISCHARGE AND APPARATUS THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to processes and apparatuses for shaping workpieces by means of electrical discharges, and more particularly to a method and apparatus for shaping a workpiece by impressing intermittent voltage pulses across a working gap between a workpiece and an electrode and controlling the lengths of the voltage pulses in accordance with the condition of said working gap.

2. Description of the Prior Art

In general, the condition existing in the working gap of a process for shaping or etching a workpiece by means of an electrical discharge may change rapidly causing damage to the electrode as well as the workpiece. For example, powdered waste material from the shaping operation may accumulate at a point in the working gap, causing the current density at that point to be increased, and resulting in the production of a relatively large cavity on the surface of the workpiece. In the prior art, it was customary to have an operator observe the condition existing in the working gap and to control the application of electrical voltage or current in response to his observations. However, controlling the shaping process in this manner proved to be an extremely difficult task which could be accurately accomplished only by extremely skilled operators.

In order to explain in greater detail the problems created when conventional processes and apparatuses are used, attention is directed to FIGS. 1 thru 4 which illustrate a prior art apparatus and its operation.

FIG. 1 illustrates an electrical discharge shaping electrode 1 positioned adjacent a workpiece 2. The electrode 1 and the workpiece 2 may be immersed in an insulating fluid such as oil or kerosene. The working gap, which is the space between the electrode and the workpiece, is therefore filled with whatever insulating fluid is used. A plurality of transistors 3A, 3B . . . 3N, which are connected in parallel and coupled to the workpiece 2, are provided to generate square wave voltage pulses to create intermittent discharge currents in the working gap. As will be understood by those skilled in the art, the number of transistors used depends upon the amount of discharge current required. For example, only one transistor is needed when a very low discharge current is required, while a large number of transistors are required for high discharge currents. A plurality of resistors 4A, 4B . . . 4N are coupled to the collector electrodes of resistors 3A, 3B . . . 3N, respectively, for controlling and balancing the current flow through the transistors. A second plurality of resistors 5A, 5B . . . 5N coupled to the base electrodes of resistors 3A, 3B . . . 3N, respectively, are provided to control the base current of the transistors. A timer 6 is provided which includes a pulse generating circuit comprised, for example, of a non-stable multivibrator, a monostable multivibrator, or a flip-flop circuit. A pulse amplifier 7 is coupled to timer 6 at its input and to resistors 5A, 5B . . . 5N at its output to supply switching pulses from timer 6 to transistos 3A, 3B . . . 3N. A DC power source $E_o$ is coupled between shaping electrode 1 and the respective emitter electrodes of transistors 3A, 3B . . . 3N.

FIGS. 2A and 3A illustrate various voltage waveforms which may exist in the working gap of the apparatus of FIG. 1, while FIGS. 2B and 3B illustrate various current waveforms which may exist in the working gap of the apparatus of FIG. 1. In FIGS. 2A, 2B, 3A and 3B, the pulse length 8, quiescent period duration 9, no-load voltage impressing time 10, discharge duration 11, no-load voltage 12, discharge voltage 13, discharge current 14, peak discharge current 15, and average processing current 16 are illustrated. In FIGS. 2A and 2B, the pulse duration and quiescent period duration are maintained constant, while in FIGS. 3A and 3B, the duration of the discharge in the working gap is maintained constant. FIGS. 2A, 2B, 3A and 3B illustrate the operation of two conventional types of electrical workpiece shaping apparatuses under ideal conditions; that is, when no waste FIG. 2A, has accumulated in the working gaps of these apparatuses. As can be seen from FIGS. 2A and 3A, under ideal conditions, the no-load voltage 12 appears during each operating cycle and the average no-load voltage impressing time 10 is consequently controlled, since the average 2A voltage within the working gap is maintained constant. However, as waste powder accumulates in the working gap, the no-load voltage impressing time 10 is diminished, and may eventually vanish, resulting in damage to the workpiece, as described above. This situation is illustrated in FIG. 4A, wherein the voltage pulses are illustrated as remaining at the discharge voltage level 13, and never rise to the no-load voltage level 12. In physical terms, this means that a discharge occurs in the working gap at the instant transistors 3A, 3B . . . 3N are switched on. As a result of this condition, the average discharge duration and the average discharge current are substantially increased, as shown in FIG. 4B. Thus, the average processing current level 16 is at a higher level in FIG. 4B than in either FIG. 2B or FIG. 3B. If this unfavorable condition exists in the working gap for a period of time, the electrical discharge which may be concentrated at a point, causes further deterioration in the condition of the working gap, further increasing the possibility of damage to the workpiece.

In order to overcome the condition illustrated in FIG. 4, it is necessary to decrease the average processing current and to return the working gap to its normal condition. It is possible to decrease the average processing current by detecting the average condition of the working gap by measuring the average no-load voltage impressing time, for example, and regulating the duration of the discharge in the working gap in response to the average condition detected. However, in conventional processes using conventional apparatuses, it is difficult to rapidly follow the changing conditions of the gap, and therefore it has been difficult to properly respond to the changing conditions.

SUMMARY OF THE INVENTION

Accordingly, it is one object of this invention to provide a new and improved process for shaping a workpiece through an electrical discharge which maintains the working gap between the working electrode and the workpiece in a favorable condition.

Another object of this invention is to provide a new and improved apparatus for shaping a workpiece through an electrical discharge which regulates the duration of working voltage pulses depending upon the condition existing in the working gap between the working electrode and the workpiece.

Briefly, these and other objects are attained in accordance with the process of the instant invention by controlling the discharge duration of each of the working pulses in response to the no-load voltage impressing time of each pulse. The average processing current is therefore also controlled by the no-load voltage impressing time. In accordance with the apparatus of the instant invention, a capacitor circuit is provided which discharges during the no-load voltage impressing time of each working pulse, and charges during the discharge duration of each working pulse. When the caacitor circuit charges to a predetermined value, it terminates the duration of each working pulse.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein:

FIG. 1 is a schematic diagram of a prior art apparatus for shaping a workpiece through electrical discharges;

FIG. 2A is a characteristic voltage waveform of the apparatus of FIG. 1;

FIG. 2B is a characteristic current waveform of the apparatus of FIG. 1;

FIG. 3A is a second characteristic voltage waveform of the apparatus of FIG. 1;

FIG. 3B is a second characteristic current waveform of the apparatus of FIG. 1;

FIG. 4A is a characteristic voltage waveform of the apparatus of FIG. 1 illustrating a short-coming of the prior art apparatus;

FIG. 4B is a characteristic current waveform corresponding to the voltage waveform of FIG. 4A;

FIG. 5 is a schematic and block diagram of a preferred embodiment of the electrical discharge shaping apparatus of the present invention;

DESCRIPTION OF THE PREFERRED EMBODIMENT

Figure 6:
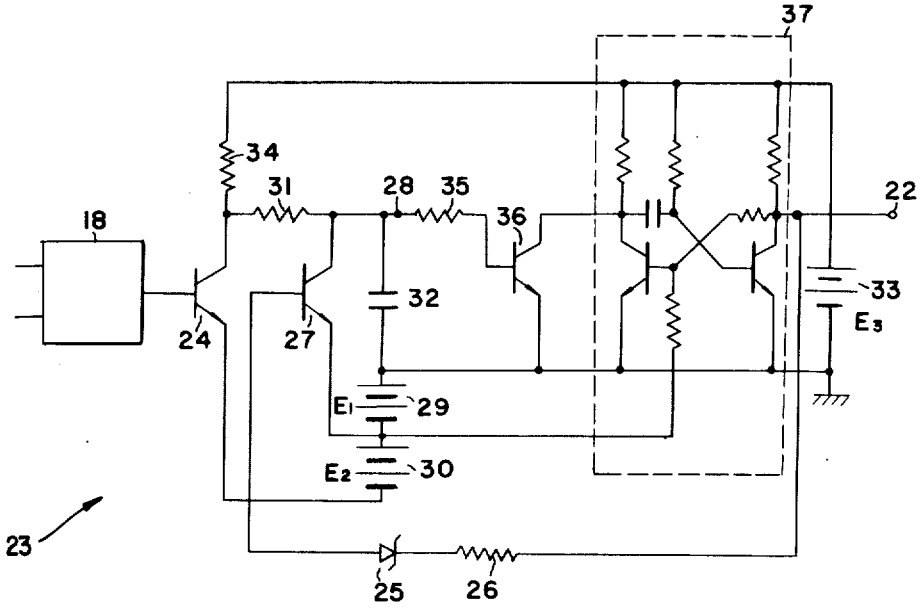
FIG. 6 is a schematic diagram illustrating in greater detail one of the components illustrated in FIG. 5.

Having described FIGS. 1 thru 4 which relate to the prior art, attention is now directed to FIGS. 5 thru 7, wherein like reference numerals designate identical or corresponding parts throughout the several views, and more particularly to FIG. 5 thereof, wherein one embodiment of the present invention is illustrated. As will be apparent from a comparison of FIGS. 1 and 5, the apparatus illustrated in FIG. 5 contains many elements which are identical to the apparatus of FIG. 1. More particularly, FIG. 5 includes a working electrode 1 separated by a working gap from a workpiece 2. A plurality of transistors 3A, 3B . . . 3N are coupled together in parallel, as in FIG. 1. Again, the number of transistors used depends upon the magnitude of the current required in the working gap. Resistors 4A, 4B . . . 4N and 5A, 5B . . . 5N are coupled to the collector and base electrodes, respectively, of transistors 3A, 3B . . . 3N, as in the FIG. 1 apparatus. A timer circuit, or timer-counting circuit 6, is coupled through an amplifier 7 to each of resistors 5A, 5B . . . 5N. A DC voltage source $E_o$ is coupled between working electrode 1 and the emitter circuits of transistors 3A, 3B . . . 3N. All of these elements are also illustrated in FIG. 1. However, the apparatus of the present invention, as illustrated in FIG. 5, includes the following additional elements. A shunt resistance 17 is coupled between one terminal of DC voltage source $E_c$ and the emitter electrodes of transistors 3A, 3B . . . 3N. A discharge initiation detector 18 is coupled across shunt resistor 17. A no-load voltage impressing timer 19 is coupled between discharge initiation detector 18 and an electrical discharge duration controller 20, which, along with a quiescent length tester 21, is included in timer 6. The discharge initiation detector 18, no-load voltage impressing timer 19, and timer 6 comprise a control device, designated 23.

In operation, a working voltage is impressed across the working gap between electrode 1 and workpiece 2 by switching transistors 3A, 3B . . . 3N to their conductive state by means of an appropriate signal from timer 6 acting through amplifier 7. After a brief delay period from the time at which voltage is first impressed across the working gap, an electrical discharge occurs in the working gap and current flows through shunt resistor 17. The electrical discharge initiation detecting circuit senses the voltage drop across shunt resistor 17 due to the current flowing through it, and thereby detects the initiation of an electrical discharge in the working gap. The no-load voltage impressing time, which is the time between the instant at which a voltage is impressed across the working gap and the instant at which a discharge is initiated in the working gap is then measured by the no-load voltage impressing timer 19. The duration of the electrical discharge is controlled by the electrical discharge duration control circuit 20. This circuit is time controlled, and switches transistors 3A, 3B . . . 3N to their non-conductive state after a specified period of time. The quiescent length tester 21 determines the interval during which transistors 3A, 3B . . . 3N are maintained in their non-conductive or open circuit state. It will be noted that quiescent length tester 21 is coupled through a terminal 22 to amplifier 7.

The duration of the electrical discharge produced by this apparatus can be controlled by the no-load voltage impressing time using a control apparatus to be described hereinafter. In accordance with the operation of this control apparatus, when an electrical discharge occurs at the same instant that a working voltage is impressed across the working gap, that is, when the voltage across the working gap does not reach the no-load voltage level during a working pulse, the electrical discharge duration is minimized, thereby reducing the average processing current. The control apparatus can also limit and control the maximum duration of the electrical discharge in the working gap by increasing the no-load voltage impressing time, as is described below.

The control device 23 is illustrated in greater detail in FIG. 6. As described above, a terminal 22 of control device 23 is coupled through amplifier 7 to transistors 3A, 3B . . . 3.l. These transistors are in their non-conductive state when a signal is applied to terminal 22 and they are in their conductive state when no signal is applied to the terminal 22.

Control device 23 includes a transistor 24 which is coupled to the output of the electrical discharge initiation detector 18. Transistor 24 is controlled by the electrical discharge initiation detector 18 such that it is in its non-conductive state only during an electrical discharge in the working gap. A zener diode 25 is coupled through a base resistor 26 to terminal 22 and is also connected to the base of a transistor 27. Zener diode 25 is in its conductive state when a signal is applied to terminal 22 and is in its non-conductive state when no signal is applied to terminal 22. Accordingly, when a signal is applied to terminal 22, transistor 27 is switched to its conductive state by the current flowing through base resistor 26 and zener diode 25. The collector electrode of transistor 27 is coupled through a resistor 31 to the collector electrode of transistor 34, and is also coupled through a capacitor 32 to the positive terminal of a DC source 29 or $E_1$. The emitter electrode is connected to the negative terminal of DC source 29. A second DC source 30 or $E_2$ is connected a its positive terminal to the negative terminal of DC source 29 and is connected at its negative terminal to the emitter electrode of transistor 24. A third DC source 33 or $E_3$ is coupled at its positive terminal through a resistor 34 to the collector electrode of transistor 24 and is coupled at its negative terminal to the positive terminal of DC source 29, the emitter electrode of a transistor 36 and to the emitter electrodes of two other resistors housed in a monostable multivibrator 37. The collector electrode of transistor 27 is coupled through a terminal point 28 to a resistor 35 which is coupled to the base of a transistor 36. Transistor 36 is coupled at both its collector and emitter electrodes to monostable multivibrator 37.

In the operation of this circuit, transistor 24 is in its conductive state and transistor 27 is in its non-conductive state when no electrical discharge is produced in the working gap. In this condition, the electric potential of the terminal point 28 drops to a constant level which is determined by the values of resistor 31 and condenser 32, by the polarity of DC source 29 ($-E_1$) and by the sum of the electric potentials of DC power sources 29 and 30 [$-(E_1+E_2)$].

When an electrical discharge exists in the working gap, transistors 24 and 27 are both switched to their non-conductive states. Accordingly, capacitor 32 charges, and the potential at terminal 28 increases to a level which is determined by the values of resistor 31 and capacitor 32 and by the electric potential of DC source 33 ($E_3$). After a certain time delay, during which the electric potential of the terminal 28 becomes positive, transistor 36 is switched to its conductive state through the base resistor 35, whereby monostable multivibrator 37 is actuated. This causes transistors 3A, 3B . . . 3N to be switched to their non-conductive state so that the voltage applied across the working gap is reduced to zero. After a predetermined time delay, the monostable multivibrator 37 returns to its initial condition, and voltage is again impressed across the working gap. If the no-load voltage initially impressed across the working gap is maintained for a sufficiently long interval, capacitor 32 charges to its maximum negative voltage, namely, $-(E_1+E_2)$ volts, and remains constant at this voltage level.

Figure 7A:
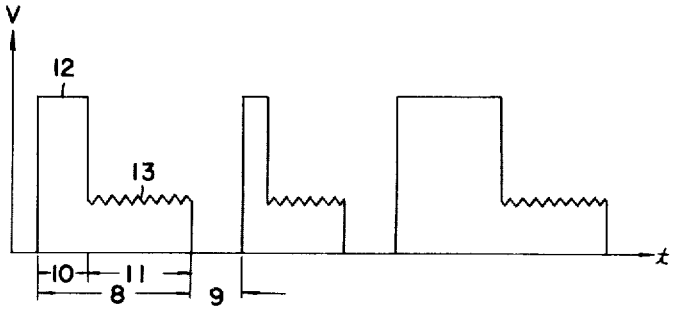
FIG. 7A is a characteristic voltage waveform of the of the apparatus illustrated in FIG. 5.
Figure 7B:
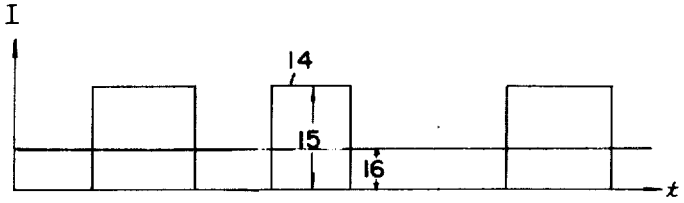
FIG. 7B is a characteristic voltage waveform of the apparatus illustrated in FIG. 5; and, FIG. 7C is a graphical illustration of fluctuations in potential at a terminal 28 in the schematic diagram of FIG. 6.
Figure 7C:
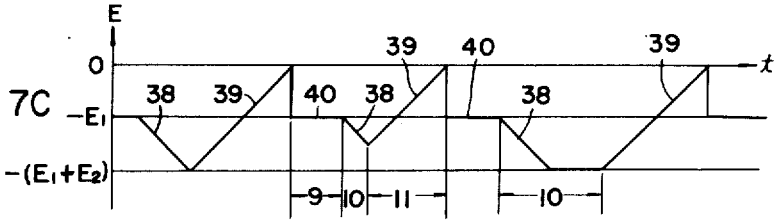

The manner in which the control device illustrated in FIG. 6 regulates the duration of the discharge in the working gap is illustrated more clearly in FIGS. 7A, 7B and 7C. It will be recalled that FIG. 7A illustrates the voltage waveform existing in the working gap, while FIG. 7B illustrates the current waveform existing in the working gap. FIG. 7C illustrates the potential of the terminal 28 in FIG. 6, which is equivalent to the voltage on capacitor 32. Referring to FIG. 7C, the numeral 38 designates the electric potential of the terminal 28 during the no-load voltage impressing time. The numeral 39 designates the electric potential of the terminal 38 during an electrical discharge in the working gap. The numeral 40 designates the electric potential of the terminal 28 during the quiescent period. As will be clear from reference to FIG. 7, the voltage or potential or terminal 28 is set by the circuit illustrated in FIG. 6 at $-E_1$ during the quiescent period 9. During the no-load voltage impressing time 10, the potential at terminal 28 decreases as illustrated at 38 due to negative charge accumulating on capacitor 32. If the no-load voltage impressing time is short, only a small additional negative charge will accumulate on capacitor 32. However, if the no-load voltage impressing time is long, capacitor 32 will charge to its maximum negative voltage value of $-(E_1+E_2)$, and will remain at this value until a discharge occurs in the working gap. When a discharge occurs in the working gap, capacitor 32 will discharge as illustrated at 39 until the potential at terminal 28 reaches zero volts. At this time, transistors 3A, 3B . . . 3N are switched to their non-conductive states, and the working pulse is terminated. The physical significance of the mode of operation just described is as follows. If the no-load voltage impressing time is long enough to permit capacitor 32 to charge to its maximum negative voltage of $-(E_1+E_2)$, the duration 11 of the discharge in the working gap will reach its maximum value. This maximum value is determined by the time required for capacitor 32 to charge from its maximum negative voltage value of $-(E_1+E_2)$ to zero volts. If the no-load voltage impressing time 10 is longer than the time required for capacitor 32 to charge to its maximum negative voltage value of $-(E_1+E_2)$, the duration 11 of the discharge in the working gap will still remain at its maximum value, since the same amount of time is required to discharge capacitor 32 to zero volts. However, if the duration of the no-load voltage impressing time 10 is less than the time required to charge capacitor 32 to its maximum negative voltage, the duration 11 of the discharge in the working gap is reduced, since then the duration 11 of the discharge in the working gap only continues for a period of time required to charge capacitor 32 from a voltage between $-E_1$ and $-(E_1+E_2)$ to zero volts. This period of time is, of course, less than the maximum discharge duration. As a result, it is clear that the control device of FIG. 6 reduces the duration of the discharge in the working gap in response to decreases in the no-load voltage impressing time. Reduction of the discharge duration also reduces the average processing current. Since the length of the no-load voltage impressing time is a measure of the condition of the working gap as described above (a measure of the accumulation of waste powder, for example), the control apparatus 23 effectively controls the average processing current in response to changing conditions in the working gap. The effect of so regulating the average processing current is to improve the condition in the working gap and generally maintain the stability of the workpiece shaping process.

It will be noted that it is not necessary to decrease the voltage across the working gap to zero volts during the quiescent period. It is necessary only to reduce the voltage sufficiently to stop the discharge current in the working gap. In addition, the no-load voltage need not be a constant voltage, but may consist of multiple high voltage levels or impulse voltages. It is also possible to use a device which detects the end of the no-load voltage period in place of the device for detecting the initiation of electrical discharge in the working gap.

Obviously, numerous additional moddifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for shaping a workpiece using electric current comprising the steps of:

positioning a workpiece adjacent a working electrode such that the electrode and the workpiece are separated by a working gap, impressing an intermittent pulse voltage across said working gap, *said intermittent pulse voltage comprising a repeating no-load voltage followed by a discharge voltage at the commencement of which a substantial current begins to flow within said working gap followed by a quiescent period during which no voltage is present in the gap,* detecting the *no-load* time period between the instant at which a *no-load* voltage is impressed across said working gap and the instant at which a substantial current begins to flow within said working gap; and, controlling the length of time during which said substantial current flows directly in response to the length of said *no-load* detected time period *and independently of the length of the quiescent period.*

2. A process as in claim 1, wherein said step of controlling includes the steps of:

reducing the length of time during which said substantial current flows in said working gap below a maximum predetermined length of time provided said *no-load* time period is less than a predetermined interval; and, permitting said substantial current to flow for said maximum predetermined length of time provided said *no-load* time period is greater than said predetermined interval.

3. An apparatus for shaping a workpiece by electric current comprising:

switching means for impressing a voltage across a working gap between an electrode and a workpiece, *said voltage comprising a repeating no-load voltage followed by a discharge voltage followed by a quiescent period during which no voltage is present in the gap,* said voltage remaining at a no-load level until a substantial current flows in said working gap, timing means for measuring the time period during which said no-load voltage *exclusive of the discharge voltage and the quiescent period* exists across said working gap; and, control means coupled to said no-load voltage time measuring means for controlling the duration of flow of said substantial current directly in response to the output from said no-load voltage time measuring means *and independently of the length of the quiescent period.*

4. An apparatus as in claim 3, further comprising:

a source of potential coupled to said electrode, and, shunt resistance means coupled between said source of potential and said switching means.

5. An apparatus as in claim 4, wherein:

said switching means comprises a plurality of transistors coupled in parallel with one another; and, said control means includes, discharge initiation detector means coupled to said shunt resistance means for detecting initiation of a current in said working gap by sensing a current flow through said shunt resistance means.

6. An apparatus as in claim 5, wherein:

said timing means is coupled to and controlled by said discharge initiation detector means.

* * * * *